Patented July 13, 1948

2,444,905

UNITED STATES PATENT OFFICE 2,444,905

PREVENTION AND DESTRUCTION OF WEEDS

Wilfred Archibald Sexton, Manchester, England, assignor to Imperial Chemical Industries Limited, a corporation of Great Britain No Drawing. Application August 14, 1945, Serial No. 610,864. In Great Britain June 28, 1943

Section 1, Public Law 690, August 8, 1946
Patent expires June 28, 1963

12 Claims. (Cl. 167—45)

This invention relates to the prevention and destruction of weeds.

I have found that 2,4,5-trichlorophenyl-acetic acid and its water-soluble salts are effective against weeds.

Water-soluble salts of 2,4,5-trichlorophenylacetic acid which may be used in my invention include the ammonium salts, and the alkali metal salts, in particular the sodium and potassium salts. Salts of organic bases may also be used, for example salts of primary and secondary alkyl amines such as methylamine, ethylamine, n-propylamine, isopropylamine, dimethylamine, diethylamine, di-n-propylamine, di-isopropylamine.

The substances are generally effective in quantities of a few pounds per acre and so in order to be able to effectively distribute them, they are incorporated in larger quantities of solid or liquid diluents.

Although exerting a phytocidal action on weeds, preparations can be supplied to ground containing germinating or growing weeds and cereal or other useful crops so as to kill or stunt the weeds effectively without harming the useful cereal crops. The preparations are, however, in general most conveniently applied to the soil before, during or immediately after germination of the weed.

Thus, the substances can be used very effectively for the control of charlock in oat crops. When applied to the soil before germination, the growth of charlock can be prevented without harming the oats.

It is already known to spray sulphuric acid of strength 5% to 10% on charlock. Sulphuric acid, however, is not only corrosive, but it neutralises and renders inactive a corresponding amount of lime or other alkali in the soil.

As solid diluents there may be used fertilisers, soil-conditioning agents or inert diluents. These solid diluents are conveniently mixed in such proportions that the soil receives the correct dressing both of weed killing substance and fertiliser, soil-conditioning agent and/or diluent. Inorganic and organic fertilisers and manures may be used, for example ammonium sulphate, basic slag, potash salts, and superphosphates, peat, and hop manures. Hydrated lime, ground lime, and chalk are convenient soil-conditioning agents. Sand, talc, and clay in powder form may be used as solid inert diluents. By an inert diluent I mean a diluent which is neither a fertiliser nor a soil conditioning agent, and is without harmful effect on crops.

As a liquid diluent water may be used so as to produce aqueous dispersions or aqueous solutions. Generally speaking, 2,4,5-trichlorophenylacetic acid can be used as a dispersion, and its water-soluble salts as solutions. Such dispersions are preferably made so as to contain wetting agents, such as are well known in the agricultural and horticultural industry, or adjuvants. With such aqueous dispersions uniform spreading is simple and easy. Wetting agents and adjuvants can also be used in aqueous solutions of the salts.

The following examples illustrate but do not limit the invention, all parts being by weight.

Example 1

100 parts of chalk were intimately mixed with 5 parts of the sodium salt of 2,4,5-trichlorophenylacetic acid. The resulting mixture could be applied to soil containing oat seedlings and weeds at the rate of 1 cwt. per acre. This prevented the establishment of weeds without harming the cereal crop.

Example 2

100 parts of the sodium salt of 2,4,5-trichlorophenylacetic acid were intimately mixed with 100 parts of ammonium sulphate. The resulting mixture when applied to the soil after oats had been sown, and prior to germination, at 100 lb. per acre, prevented establishment of weeds, while encouraging the growth of the oats.

A suitable process for the preparation of the 2,4,5-trichlorophenylacetic acid and its water-soluble salts employed in the compositions and methods of this invention is set out and claimed in my copending application, Serial No. 610,863, filed of even date herewith. According to the processes of the copending application, 2,4,5-trichlorophenylacetic acid is prepared by reacting 2,4,5-trichlorobenzyl chloride with an alkali metal cyanide to produce 2,4,5-trichlorobenzyl cyanide and then the cyanide compound is hydrolyzed to give the desired 2,4,5-trichlorophenylacetic acid. The water-soluble salts of 2,4,5-trichlorophenylacetic acid are readily prepared in the conventional manner by neutralizing the acid with a suitable basic compound. A specific example of the preparation of 2,4,5-trichlorophenylacetic acid, as set out in my aforementioned copending application, is repeated below.

Example 3

28.4 parts of 2,4,5-trichlorobenzyl chloride, prepared in the known manner from trichlorotoluene (Beilstein & Kuhlberg, Annalen 1869, 150, 286) were boiled for 3 hours with 10.8 parts of sodium cyanide and 80 parts of ethyl alcohol. The reaction mixture was poured into water and the resulting oily trichlorobenzyl cyanide hydrolyzed by boiling for 6 hours with 80 parts of a 10% solution of sodium hydroxide in ethyl alcohol. The reaction mixture was diluted, separated from some tarry impurities, and the 2,4,5-trichlorophenylacetic acid precipitated by acidification with hydrochloric acid. After purification by recrystallization from alcohol, the compound melted at 156° C.

I claim:

1. The method of destroying weeds growing in a cereal crop which comprises applying to the soil carrying the crop a compound selected from the group consisting of 2,4,5-trichlorophenylacetic acid and its water-soluble salts in amount sufficient to exert an herbicidal action.

2. The method of destroying weeds growing in a cereal crop which comprises applying to the soil carrying the crop an aqueous dispersion of 2,4,5-trichlorophenylacetic acid in amount sufficient to exert an herbicidal action.

3. The method of destroying weeds growing in a cereal crop which comprises applying to the soil carrying the crop an aqueous solution of a water-soluble salt of 2,4,5-trichlorophenylacetic acid in amount sufficient to exert an herbicidal action.

4. The method of destroying weeds growing in a cereal crop which comprises applying to the soil carrying the crop an aqueous solution of an alkali metal salt of 2,4,5-trichlorophenylacetic acid in amount sufficient to exert an herbicidal action.

5. A composition suitable for destroying weeds comprising a carrier material and a compound selected from the group consisting of 2,4,5-trichlorophenylacetic acid and its water-soluble salts in amount sufficient to exert an herbicidal action.

6. A dry pulverulent composition according to claim 5 in which the said carrier material is a solid diluent.

7. A composition according to claim 5 in which a water-soluble salt of 2,4,5-trichlorophenylacetic acid is used in aqueous solution in amount sufficient to exert an herbicidal action.

8. A composition according to claim 5 in which 2,4,5-trichlorophenylacetic acid is used in aqueous dispersion in amount sufficient to exert an herbicidal action.

9. A method for the prevention and destruction of weeds which comprises applying to a locus to be protected a compound selected from the group consisting of 2,4,5-trichlorophenylacetic acid and its water-soluble salts in amount sufficient to exert an herbicidal action.

10. A method for the prevention and destruction of weeds which comprises applying to a locus to be protected an aqueous dispersion of 2,4,5-trichlorophenylacetic acid in amount sufficient to exert an herbicidal action.

11. A method for the prevention and destruction of weeds which comprises applying to a locus to be protected an aqueous solution of a water-soluble salt of 2,4,5-trichlorophenylacetic acid in amount sufficient to exert an herbicidal action.

12. A method for the prevention and destruction of weeds which comprises applying to a locus to be protected an aqueous solution of an alkali metal salt of 2,4,5-trichlorophenylacetic acid in amount sufficient to exert an herbicidal action.

WILFRED ARCHIBALD SEXTON.

REFERENCES CITED

The following references are of record in the file of this patent:

UNITED STATES PATENTS

| Number | Name | Date |
| --- | --- | --- |
| 2,394,916 | Jones | Feb. 12, 1946 |
| 2,080,378 | Quinn | May 11, 1937 |